United States Patent [19]
Yagi et al.

[11] 3,884,211
[45] May 20, 1975

[54] COMBUSTION CHAMBER DEVICE FOR AN INTERNAL COMBUSTION ENGINE

[75] Inventors: Shizuo Yagi, Asaka; Yoshitoshi Sakurai, Kawasaki; Isamu Minowa, Wako, all of Japan

[73] Assignee: Honda Giken Kogyo Kabushiki Kaisha, Tokyo, Japan

[22] Filed: June 29, 1973

[21] Appl. No.: 375,060

[30] Foreign Application Priority Data
June 30, 1972 Japan.................................. 47-77413

[52] U.S. Cl............ 123/191 S; 123/32 J; 123/32 K; 123/32 AA; 123/32 ST; 123/32 SP; 123/75 B
[51] Int. Cl........................ F02b 23/00; F02b 75/02
[58] Field of Search.......... 123/32 C, 32 D, 32 AA, 123/32 K, 32 L, 32 ST, 32 SP, 32 SA, 75 B, 123/191 S, 191 SP

[56] References Cited
UNITED STATES PATENTS

| | | | |
|---|---|---|---|
| 2,690,742 | 10/1954 | Kuepfer | 123/32 C |
| 2,799,256 | 7/1957 | Stump | 123/32 C |
| 3,058,452 | 10/1962 | Espenschied | 123/32 C |
| 3,259,116 | 7/1966 | Bricout | 123/32 C |
| 3,270,722 | 9/1966 | Bernard | 123/32 ST |
| 3,443,553 | 5/1969 | Yamada et al. | 123/32 L |

Primary Examiner—Charles J. Myhre
Assistant Examiner—Tony Argenbright
Attorney, Agent, or Firm—Lyon & Lyon

[57] ABSTRACT

A combustion chamber configuration for a reciprocating internal combustion engine of the type having an auxiliary combustion chamber associated with each main combustion chamber. The auxiliary combustion chamber is provided with a liner which is of low heat capacity and is positioned to preclude substantial heat loss to the cylinder head in which its placed. Further, the liner is exposed in one area to the main combustion chamber and is thereby heated by the combustion of the air-fuel mixture within the main combustion chamber. A nozzle is provided between the auxiliary combustion chamber and the main combustion chamber through a port in the liner which is displaced from the portion of the liner exposed to the main combustion chamber.

3 Claims, 1 Drawing Figure

PATENTED MAY 20 1975　　　　　　　　　　　　　3,884,211
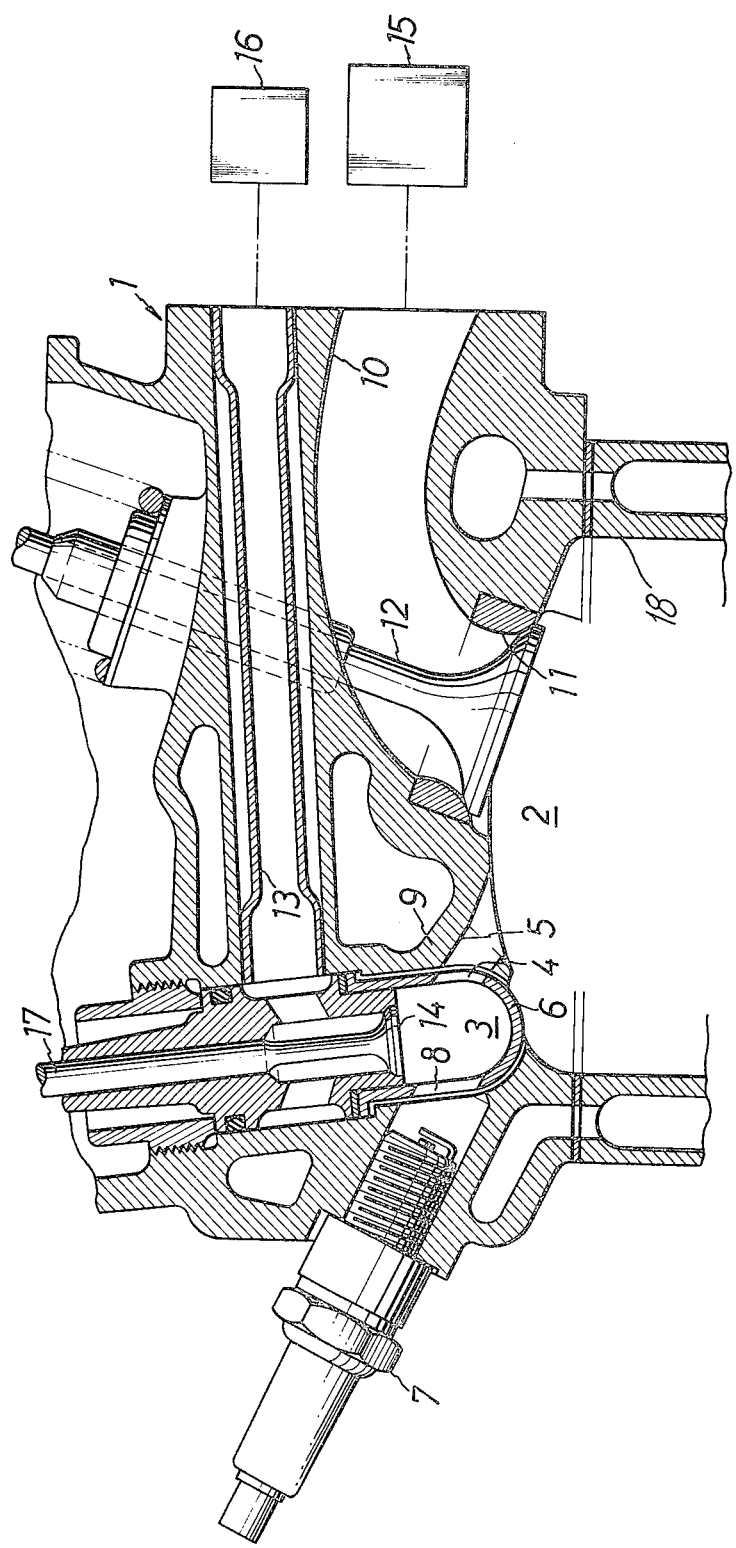

COMBUSTION CHAMBER DEVICE FOR AN INTERNAL COMBUSTION ENGINE

This invention relates to an internal combustion engine having an auxiliary combustion chamber associated with each main combustion chamber. More specifically, this invention is directed to an improved combustion chamber configuration whereby heat flow to and from the auxiliary combustion chamber is advantageously controlled.

Reciprocating, internal combustion engines employing an auxiliary combustion chamber with each main combustion chamber have been developed which substantially reduce the amount of pollutants exhausted during operation. Each auxiliary combustion chamber is provided with an inlet valve for receiving a rich air-fuel mixture, a spark plug, and a nozzle leading to the respective main combustion chamber. Each main combustion chamber is in immediate association with a piston and is intermittently supplied with a lean air-fuel mixture. The auxiliary combustion chamber is substantially smaller than the main combustion chamber and is consequently more susceptible to heat loss through the walls thereof. This heat loss is aggravated by the placement of the auxiliary combustion chamber within the cylinder head. The cylinder head provides a substantial heat sink into which the heat from the combustion of the rich air-fuel mixture is drawn. Further, an elongated path or torch nozzle leading from the auxiliary combustion chamber to the main combustion chamber is employed. This further displaces the auxiliary combustion chamber from the main combustion chamber and aggravates the above heat loss problems.

The present invention provides a combustion chamber configuration which presents the auxiliary combustion chamber in proximate thermal association with the main combustion chamber. As a result, the ignition of the air-fuel mixture within the main combustion chamber will effect a heating of the auxiliary combustion chamber. An elongated torch nozzle extends between the auxiliary combustion chamber and the main combustion chamber through the engine head at a position displaced from the area where the auxiliary combustion chamber is in proximate thermal association with the main combustion chamber.

Accordingly, it is an object of the present invention to provide an internal combustion engine of the type employing an auxiliary combustion chamber associated with each main combustion chamber wherein the auxiliary combustion chamber is in proximate thermal association with the main combustion chamber.

Another object of the present invention is to provide an internal combustion engine designed for thermal association with the main combustion chamber wherein an elongated passageway is provided between the auxiliary combustion chamber and the main combustion chamber.

Other and more detailed objects and advantages will appear hereinafter.

The drawing is a sectional view of an internal combustion engine illustrating a preferred embodiment of this invention.

Referring to the drawing, a cross-section of a single combustion chamber configuration of the present invention is illustrated. Only one such chamber configuration is illustrated for convenience and clarity. Other such chambers may be associated in the same engine block without varying from the inventive concepts and apparatus associated with each individual chamber configuration. Consequently, it is to be understood that more than one such chamber configuration may be incorporated in a single engine. Each such configuration includes a main combustion chamber 2 defined by the engine head 1, the cylinder block 18 and a piston (not shown) conventionally positioned within the cylinder block 18. An auxiliary combustion chamber 3 is provided in the engine head 1.

The main combustion chamber 2 is provided with an intake passage 10 which is in communication with a carburetor, schematically illustrated as 15. The intake passage 10 is controlled by intake valve 12 at the intake opening 11. An exhaust passageway (not shown) is also provided to the main combustion chamber 2. An auxiliary intake passage 13 is associated with the auxiliary combustion chamber 3. The auxiliary intake passage 13 is in communication with a carburetor, schematically illustrated as 16. An auxiliary intake valve 17 cooperates with the intake port 14 to control flow through the auxiliary intake passage 13. A spark plug 7 is provided to the auxiliary combustion chamber 3 and is in communication therewith through passageway 8. The auxiliary combustion chamber 3 is in communication with the main combustion chamber 2 through the passageway provided by a torch nozzle 4 and a flame conducting passageway 5.

A rich air-fuel mixture is drawn into the auxiliary combustion chamber 3 from carburetor 16. A lean air-fuel mixture is drawn into the main combustion chamber 2 from carburetor 15. The rich air-fuel mixture is ignited by the spark plug 7 and a flame is thereby generated which projects into the main combustion chamber 2 through the torch nozzle 4 and the flame passageway 5. The introduction of the flame through the torch nozzle 4 acts to bring about ignition and combustion of the lean mixture within the main chamber 2. Following combustion, the main combustion chamber 2 is voided through the exhaust outlet. This combustion sequence can be controlled to substantially improve the cleanliness of the engine exhaust resulting in less air pollution.

It has been found desirable to keep the temperature of the auxiliary combustion chamber 3 elevated and to prevent heat transfer therefrom. In this way, the rich air-fuel mixture may be properly vaporized for more efficient combustion. A cup 6 is provided as a liner for the auxiliary combustion chamber 3. The cup 6 is of low heat capacity and is spaced from the engine head 1 to provide maximum heat retention within the auxiliary combustion chamber 3. The cup 6 extends about the interior of the auxiliary chamber 3 and is fixed at an upper rim rigidly to the engine head 1. A passageway 8 is provided through the cup 6 to provide communication with the spark plug 7. A passageway 4 is also provided to form the torch nozzle. The space between the engine head 1 and the cup 6 is enough to prevent direct conduction therebetween. To further enhance the temperature environment of the auxiliary combustion chamber 3, the auxiliary combustion chamber 3 is positioned in proximate thermal association with the main combustion chamber 2. To accomplish this thermal association, a portion of the thin walled cup 6 is exposed to the heat generated within the main combustion chamber 2 by the combusting gases. This is accomplished by placing the cavity in which the cup 6 is positioned so near the main combustion chamber 2 that a portion of the cup 6 extends through the upper surface of the combustion chamber 2. The thin wall of the cup 6 will here assist the transfer of heat from the main combustion chamber 2 into the auxiliary combustion chamber 3. Thus, the cup 6 does not itself provide a substantial heat sink and is so placed that it inhibits heat transfer to the engine head 1 and promotes heat transfer from the main combustion chamber 2 into the auxiliary combustion chamber 3.

Even though the auxiliary combustion chamber 3 is placed in immediate proximity to the combustion chamber 2, the combustion chamber configuration of the present invention provides an elongated flame passageway 5 between the main combustion chamber 2 and the auxiliary combustion chamber 3 through the engine head 1. This flame passageway 5 also directs the combusting rich mixture toward the center of the main combustion chamber 2. These features are accomplished by placing the torch nozzle 4 at a distance from the area of the cup 6 which is directly associated with the main combustion chamber 2. The extended flame passageway 5 may then direct combusting gases from the torch nozzle 4 to a central location in the main combustion chamber 2.

Thus, advantageous thermal control of the auxiliary combustion chamber 3 is provided. At the same time, proper transfer of the combusting rich air-fuel mixture to the main combustion chamber 2 is accomplished.

Having fully described the preferred embodiment of the present invention, it is to be understood that the invention is not to be limited to the details herein set forth but is of the full scope of the appended claims.

What is claimed is:

1. A combustion chamber system for a reciprocating internal combustion engine, comprising a main combustion chamber including a piston defining one wall thereof and a cylinder head defining a second wall thereof, an auxiliary combustion chamber positioned within said cylinder head, said auxiliary combustion chamber including a thin walled cup lining said auxiliary combustion chamber and spaced from said cylinder head, said cylinder head including a first opening through which said thin walled cup is exposed to said main combustion chamber and a second opening through said cylinder head and said thin walled cup defining a passageway between said auxiliary combustion chamber and said main combustion chamber, said second opening being displaced from said first opening.

2. The system of claim 1 further comprising a spark plug displaced from said auxiliary combustion chamber and in communication therewith.

3. The system of claim 1 wherein said second opening forming said passageway between said auxiliary combustion chamber and said main combustion chamber is displaced from the bottom portion of said cup.

* * * * *